United States Patent
Klemm

[15] 3,695,402
[45] Oct. 3, 1972

[54] PLUNGER STOPPED BI-DIRECTIONAL NO-BACK ASSEMBLY

[72] Inventor: Edwin O. Klemm, Saginaw, Mich.

[73] Assignee: Saginaw Products Corporation, Saginaw, Mich.

[22] Filed: June 11, 1970

[21] Appl. No.: 45,291

[52] U.S. Cl. .................................................192/8 R
[51] Int. Cl. ..............................................F16d 67/00
[58] Field of Search.......................................192/8, 7

[56] References Cited

UNITED STATES PATENTS

| | | | |
|---|---|---|---|
| 1,074,175 | 9/1913 | Howe | 192/8 |
| 2,626,027 | 1/1953 | Anderson | 192/8 |
| 3,449,978 | 6/1969 | Stimpson | 192/8 |

Primary Examiner—Benjamin W. Wyche
Assistant Examiner—Randall Heald
Attorney—Learman & McCulloch

[57] ABSTRACT

Apparatus comprising a rotatable output member, a rotatable drive member for rotating the output member in either direction, a releasable brake for substantially preventing rotation of the output member in either direction when it is not being driven by the drive member, and apparatus on the drive member is operable to release the brake upon a predetermined rotation of the drive member in either direction.

17 Claims, 7 Drawing Figures

PATENTED OCT 3 1972 3,695,402

INVENTOR
EDWIN O. KLEMM
BY Leaman & McCulloh
ATTORNEYS

PLUNGER STOPPED BI-DIRECTIONAL NO-BACK ASSEMBLY

This invention relates to no-back apparatus, and more particularly, bi-directional no-back apparatus for substantially preventing the rotation of an output member when it is not being driven in either direction by the input member.

There are many instances in which the exact positioning of a load carrying member to be moved is critical. Many of the devices which must be so positioned include a rotatable output member driven by a rotatable input member. In some applications, after the driving force applied to the rotatable input member has been removed, the force exerted on the output member by the load carried thereby is such as to rotate the output member in a direction opposite to that in which it was driven by the input member. In other instances, when the output member is being driven, the load is applied in a way such as to cause the output member to be driven at a rate faster than the rate at which it was being driven by the drive member. In this latter situation, the output member is actually no longer being driven by the input member although the drive has not been disconnected, and the "runaway" condition which results frequently causes an improperly positioned load, and may also be hazardous. In either instance, it is imperative that the output member be substantially prevented from rotating when driving force is no longer being exerted, to accurately position the output member and the load connected thereto.

Accordingly, it is an object of the present invention to provide apparatus for substantially preventing rotation of a rotatable output member in either direction after the force driving the input member has been removed therefrom.

When relatively small loads are to be moved with the rotatable output member, the torque exerted by the load tending to move the output member in either direction is relatively small. Accordingly, it is another object of the present invention to provide inexpensive, reliable bi-directional no-back apparatus which is particularly suited for restraining relatively small loads.

Braking and clutching assemblies incorporating friction discs have been utilized in prior art no-back devices, however, disc wear in these assemblies is generally a limiting factor in achieving a highly reliable product. To insure operability, the position of the friction discs relative to each other must be continuously adjusted, thus limiting the flexibility of operation. Accordingly, it is a further object of the present invention to provide bi-directional no-back apparatus which will operate substantially independently of friction disc wear.

If the no-back mechanism is constructed of parts which move into wedged relation to effect the braking force, a high starting torque must be exerted to release the no-back mechanism. Accordingly, it is still another object of the present invention to provide bi-directional, no-back mechanism, for positively braking an output member, which does not require a high starting torque for release.

A jack screw, commonly employing a screw shaft cooperating with a recirculating ball nut to raise a load supported on the nut, is a typical application with which the bi-directional no-back apparatus, formed according to the invention, may be utilized. Because of the high energy transmitting efficiency of the recirculating ball nut and screw, when the load has been raised to the proper level, and the load lifting force on the screw is removed, the downward force of the load exerted on the nut will tend to rotate the screw in a reverse direction so as to lower the load from its proper position. Accordingly, it is yet another object of the present invention to provide no-back apparatus particularly suited to this situation for preventing the reverse rotation of a load positioning member while permitting the member to be freely driven forwardly.

When a load supported on a jack screw of this type is to be lowered, it is important that the lowering be accomplished quickly, easily, and without the manipulation of unlocking levers, or the like, which must be reset to release the no-back apparatus prior to the screw shaft being driven in an opposite direction. Accordingly, a still further object of the present invention is to provide bi-directional no-back apparatus which will eliminate the preparation necessary in some prior art devices to move the output member in either direction.

Briefly, according to the present invention, there is provided an input drive member, means journaling the input drive member for rotation, means for revolving the input drive member in either direction, an output member to be driven, means journaling the output member for rotation in either direction, means coupling the input member with the output member, releasable brake means for selectively substantially preventing rotation of the output member in either direction when it is not being driven by the input drive member, and releasing means cooperating with the drive member and operable to release the brake means upon rotation of the output member in either direction by the drive member.

Figure 4:
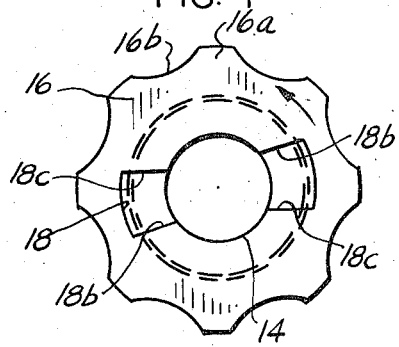
FIG. 4 is a fragmentary end elevational view of the input drive member only illustrating particularly the brake releasing portion thereof.
Figure 2:
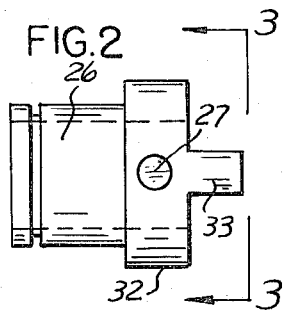
FIG. 2 is a side elevational view illustrating only a sleeve which is mounted on the screw shaft.

Referring now more particularly to the drawing wherein a preferred embodiment of the invention only is illustrated, an outer housing H for the no-back mechanism is shown as including an annular tubular section 8, formed with an internal annular boss or rib 8a, and telescopingly receiving an annular tubular section 9 having one end butted against the boss 8a. The tubular section 8 mounts, at one end, a ball bearing assembly B, journaling a rotatable, generally cylindrically shaped input drive sleeve member D. One end portion 12 of the drive member D is provided with a keyway 12a to receive a key which may secure a rotatable drive pulley (not shown), or the like on the member D. At its opposite end, the drive member D is provided with an annular flange 16 having an undulating peripheral edge which includes a plurality of lobes and curvilinear recessed portions 16a and 16b, respectively. The bore 14 through the sleeve D communicates with a pair of diametrically opposed slots 18 (FIG. 4) having radially diverging marginal walls 18b and 18c.

A typical use for the no-back apparatus is with a screw shaft S which may extend through the driver sleeve D and has a threaded portion 22 cooperating with a recirculating ball nut 24, which includes a plurality of recirculating balls 24a received within the threads, in the usual manner. A load receiving member such as a jack, schematically shown at L, may be connected with the recirculating ball nut 24 for movement axially in a linear path when the screw shaft S is rotated.

An annular sleeve 26 is mounted on the non-threaded screw shaft portion 20 and includes an annular flange portion 32 of slightly increased diameter secured to the shaft portion 20 with a pin 27. The sleeve 26 is supported for rotation within the tubular section 9 by an annular bearing assembly 29 which is axially fixed by snap rings 30 and 31 provided on the hub 26 and housing section 9, respectively. Integrally formed with the annular flange portion 32 is a pair of axially extending, projecting, diametrically opposed lugs 33 which are received within the slots 18 provided in the flange portion 16 of driver D. The circumferential extent of the slots 18 is greater than the circumferential extent of the lugs 33 to provide a lost motion connection between the drive member D and the shaft S which permits a limited relative angular displacement of the drive member D relative to the screw shaft S.

Figure 5:
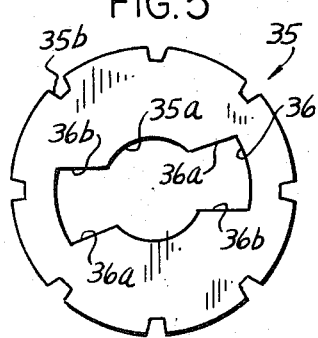
FIG. 5 is an end elevational view of a braking disc which is mounted on the screw shaft for braking the rotation thereof.

To prevent rotation of the screw shaft S when it is not being rotated by the driver D, a flat disc, generally indicated at 35, is provided which is rotatably mounted on the screw shaft portion 20. A pair of radially extending slots 36 are provided in communication with the bore 35a in disc 35 to also receive the axially extending lugs 33. As shown in the drawing, the circumferential extent of the slots 36 is substantially larger than the circumferential extent of the lugs 33, thereby also providing a lost motion connection therebetween, permitting the screw shaft S to be moved slightly relative to the disc 35 without effecting any movement thereof. The disc 35 is also provided with a plurality of circumferentially spaced apart notches 35b (FIG. 5) about the outer periphery thereof for a purpose to be presently described.

At the upper end of the housing H, as viewed in the drawing, a vertical bore 40 is provided in the annular boss 8a and receives a sleeve 41 which is internally threaded at its upper end to receive an adjustable nut 42. A hollow plunger 43 is received within the sleeve 41 and includes a locking detent 43a at its terminal end. A compression spring 44 constantly acts on the plunger 43 to yieldably urge the detent 43a toward the disc 35. When the detent 43a engages in one of the recesses 35b, the shaft S cannot be rotated because the lugs 33, after limited rotational movement, engage the stationary sides of the slots 36, thus halting any further rotational movement. The detent 43a is movable, from the disc engaging position, shown in FIG. 6, to the radially outer non-engaging position shown in FIG. 7 to permit the driver D to drive the shaft 20. When the driver D is driven, it drives the lock disengaging flange 16 relatively to the disc 35 which causes the cam surfaces 16b to move the detent 43a to the removed position.

Figure 6:
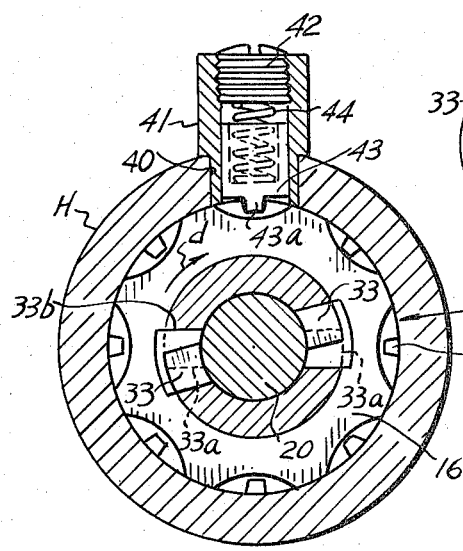
FIG. 6 is a transverse sectional view taken along the line 6 — 6 of FIG. 1.
Figure 3:
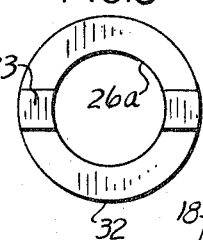
FIG. 3 is an end elevational view of the sleeve, taken along the line 3 — 3 of FIG. 2.

With the apparatus initially in the rest position illustrated in FIG. 6, the screw shaft S and disc 35 are prevented from rotating due to application of load L relative to the housing H because the detend 43a of the plunger 43 is in engagement with one of the notches 35b of the disc 35. In this position of the parts, the slots 18 in the driver D are substantially aligned with the slots 36 in the disc 35 and the load applying member L exerts an axially directed force on the nut 24 in the direction of the arrow a. This force will tend to rotate the screw shaft S in the direction of the arrow b until the sides 33a of the lugs 33 are in engagement with the sides 36a of the slots 36 after which time movement is prevented.

Figure 1:
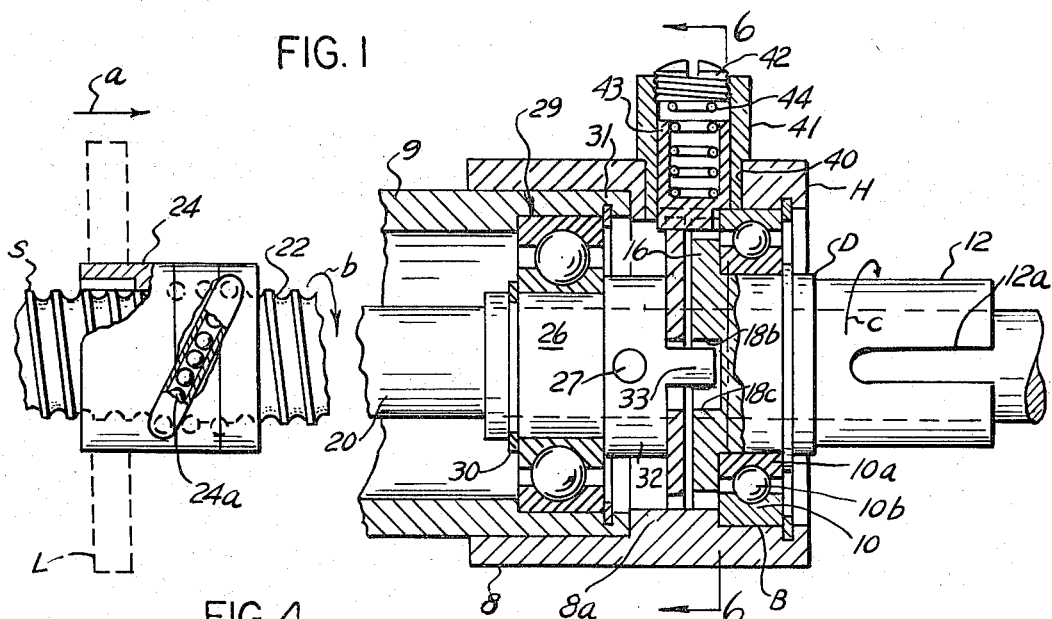
FIG. 1 is a side elevational, sectional view of bi-directional drive apparatus for controlling the rotation of a screw shaft which is connected with a recirculating ball nut.
Figure 7:
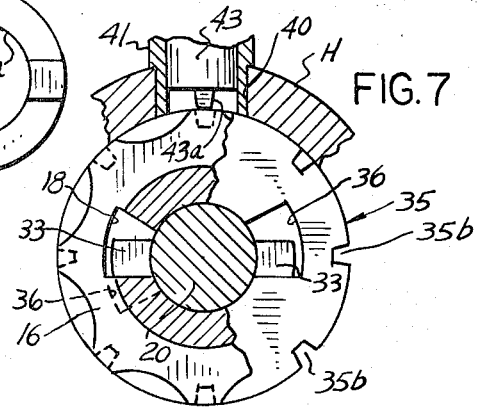
FIG. 7 is a fragmentary, end elevational view, similar to FIG. 6, and illustrating the input drive member in a slightly revolved position.

When it is desired to positively move the load L toward the left as viewed in FIG. 1, the drive member D is rotated clockwisely in the direction of the arrow c and the sides 18c of the slots 18 engage the sides 33a of the lugs 33 to move the lugs 33 from the full line position shown in FIG. 6 to the full line position shown in FIG. 7. During this initial rotation of the drive member D and shaft S, the detent 43a remains engaged in one of the recesses 35b. With continued rotation of the driver D, the cam surfaces 16b push the plunger 43 radially outwardly, overcoming the spring 44 with a gradual camming action, until the lobes 16a are axially aligned with the slots 35b of the disc 35 and the plunger detent 43a is completely removed from the slot 35b in which it was engaged. Although the disc 35 is fixed until the detent 43a is removed, the lost motion connection between the slots 36 and the lugs 33 permits rotation of the shaft S by the driver D.

When the load L has been properly positioned, and the rotative force applied to the driver D is removed, the force of the load L on the recirculating nut 24 tends to move the nut 24 in the direction of the arrow a, thus tending to cause the shaft 22 to rotate in the direction of the arrow b. The sides 33a of the lugs 33, engaging the sides 18c of the slots 18 , will move the driver D slightly counterclockwisely opposite to the direction of the arrow c. Because of the lost motion connection between the lugs 33 and the slots 36, the disc 35 remains stationary while the driver D is moving counterclockwisely to the position shown in FIG. 6 so that the detent 43a will again be received by a notch 35b on the outer periphery of the disc 35 to lock the disc 35 in position. The sides 33a of tabs 33 will engage the sides 36a of the slots 36 in disc 35 to prevent any further reverse rotation and provide a positive no-back lock. It can thus be seen that there is substantially no reverse rotation of the shaft S possible.

Should the thrust force of the load L be suddenly reversed in a direction opposite to the arrow a when the drive apparatus is being utilized to move the nut 24 and load L in toward the left as viewed in FIG. 1, the nut 24 will exert a force on the shaft S in a direction opposite the arrow $b$ to drive the shaft S at a faster rate than the driver D. The sides 33$b$ of the lugs 33 will drive the side walls 36$b$ of the slots 36 to move the disc 35 clockwisely relative to the driver D. The driver D is not affected by such a sudden overrunning movement of the shaft S because the lost motion connection between the shaft S and driver D permits the lugs 33 to move freely within the slots 18 as the sides 33$b$ of the lugs 33 approach the sides 18$b$. This relative movement will enable the detent 43$a$ to be moved radially inwardly along the camming surface 16$b$ to be received within a notch 35$b$ of the driver 35, thereby quickly stopping any runaway action. Thus, it can be seen that a positive acting bi-directional no-back mechanism has been provided.

When it is desired to move the load L toward the right as viewed in FIG. 1, the driver D is merely rotated counterclockwisely, opposite the direction of rotation indicated by the arrow $c$, so that the slot sides 18$b$ of the driver flange 16, after a slight lost motion, will engage the sides 33$b$ of the lugs 33 to drive the shaft S in the opposite direction. The lost motion connection between the lugs 33 and the disc 35 will permit the shaft S to be rotated relative thereto while one of the surfaces 16$b$ cams the detent 43$a$ radially outwardly in a manner similar to that previously described. The no-back mechanism operates bi-directionally in a similar manner when the drive is removed and to prevent overrunning.

It should be realized that, although the driver flange 16 and disc 35 are shown as provided with 8 corresponding notches and lobes, as the diameter of the apparatus is increased, more notches and lobes can be provided.

It is to be understood that the drawings and descriptive matter are in all cases to be interpreted as merely illustrative of the principles of the invention, rather than limiting the same in any way, since it is contemplated that various changes may be made in various elements to achieve like results without departing from the spirit of the invention or the scope of the appended claims.

I claim:

1. Apparatus comprising:
    a support member;
    a rotatable output member rotatably mounted by said support member;
    a rotatable drive member for rotating said rotatable output member in either direction;
    means for releasably locking said output member to said support member and releasably preventing the rotation of said output member when said output member is not being driven by said drive member in either direction including: detent means on one of said support and output members, and detent receiving means, mounted on the other of said support and output members for movement relative thereto, for removably receiving said detent means, and means for yieldably urging said detent means and said detent receiving means into engagement to lock said output member to said support member and prevent the rotation of said output member; whereby said output member has substantially instantaneously prevented from rotating after limited relative rotary movement of said output member and said locking means when said output member is not being driven by the input member in either direction; and
    releasing means cooperating with said drive member for relatively moving said detent means and said detent receiving means to overcome said yieldable means to release said locking means and automatically unlock said output member from said support member when said drive member is rotated in either direction.

2. Apparatus as set forth in claim 1 wherein said detent means is mounted on said support member; and said braking means includes a braking plate movably mounted on said output member, said detent receiving means comprising a plurality of recesses about the outer periphery of said braking plate to releasably receive said detent means.

3. Apparatus as set forth in claim 2 wherein said releasing means comprises a plurality of perimetrically spaced cam means for moving said detent means out of one of said recesses when said drive member is rotated.

4. Apparatus as set forth in claim 2 wherein said braking plate is coupled to said output member with a lost motion connection so as to be movable therewith after limited relative angular displacement of the output member and braking plate.

5. Apparatus as set forth in claim 4 wherein said drive member is coupled to said output member with a lost motion connection so as to drive said output member after limited relative angular displacement between the drive member and output member.

6. Apparatus as set forth in claim 1 wherein said releasing means comprises means on said drive member being displaceable relative to said brake means when said drive member is rotated to release said braking means.

7. Apparatus as set forth in claim 6 wherein said drive member is connected to said output member with a lost motion connection.

8. Apparatus comprising:
    a rotatable output member;
    a rotatable input member for driving the output member;
    lock means including a part with a hub portion mounted on said output member with a rotary lost motion driving connection and a cooperating portion movable from a locked position for preventing rotation of said output member in cooperation with said part to a non-locking position, after relative angular displacement of said brake means and said output member in a first direction, said cooperating portion being returnable to said locking position after relative angular displacement of said lock means and said output member in an opposite direction; whereby said output member is substantially instantaneously locked after limited rotary movement of said output member and said lock means in said opposite direction;
    said output member and said part being relatively angularly displaced in said first direction in response to rotation of said output member by said input member; and
    means responsive to rotation of the input member in either direction for moving said lock means from locking position.

9. Apparatus as set forth in claim 8 wherein said rotatable input member is connected to said output member with a lost motion connection to permit relative movement of said input member and said brake means.

10. In combination:
screw means cooperating with nut means for translating rotary motion into linear motion when one of said screw means and nut means is rotated to linearly move a load exerting a thrust force on the other of said screw means and nut means;
rotatable drive means connected to said one means with a rotary lost motion driving connection for rotating said one means in either direction;
lock means including a part with a hub portion mounted on said one means with a lost motion connection and having a cooperating portion movable between a locking position for preventing, in cooperation with said part, rotation of said one means and a non-locking position after relative angular displacement between said lock means and said one means in a first direction, said cooperating portion being returnable to said locking position after relative rotary displacement of said one means and lock means in an opposite direction; whereby said one means is substantially instantaneously locked after limited relative rotation of said one means and said locked means in said opposite direction; and
means responsive to rotation of the input member in either direction for moving said lock means from said locking position to said non-locking position, said one means and said lock means being relatively angularly displaced in a first direction in response to rotation of said drive means and relatively angularly displaced in said second direction in response to a rotation of said one means by said other means resulting from the thrust force exerted by said load on said other means.

11. The combination as set forth in claim 10 including a housing means; said lock means comprising:
recess means on said part,
detent means comprising said cooperating portion on said housing means, and
biasing means for constantly, yieldably urging said detent means toward said recess means to a locking position to prevent rotation of said one means;
said detent means being movable to a non-locking position to permit said one means to be freely driven by said drive means.
said means for moving said lock means including means on said drive means for moving said detent means against the force of said biasing means from said locking position to said non-locking position when said drive means drives said one means relative to said lock means in said first direction and to permit said detent means to return from said non-locking position to said locking position when said lock means and said one means are relatively rotated in said opposite direction.

12. The combination as set forth in claim 11 wherein said lock means includes a braking plate mounted on said one means, said recess means comprises a plurality of radially outwardly facing recesses perimetrally spaced about said braking plate, said detent means being radially movably mounted on said housing, said means for moving said detent means comprising a plurality of perimetrally spaced cam means on said drive means for moving the detent means out of one of said recesses when said drive means drives said one means.

13. The combination as set forth in claim 12 wherein said plurality of cam means comprises an annular portion forming a plurality of circumferentially interposed raised and recessed portions, each of said raised portions extending perimetrically, the width of one of said recesses.

14. The combination as set forth in claim 11 wherein said lost motion connection between said one means and said brake means includes an axially extending drive lug on said one means and cooperating drive lug receiving means on said lock means, said drive lug and drive lug receiving means being relatively circumferentially movable to permit relative movement of said one means and said screw means when said detent means moves from said non-braking position to said braking position and said screw means is rotated in said opposite direction.

15. The combination as set forth in claim 11 wherein said one means is said screw means including a screw shaft mounting a sleeve including circumferentially spaced, axially extending drive lugs; said lock means comprising a disc mounted on said shaft for limited rotation relative thereto and having apertures therein receiving said drive lugs to form said lost motion connection to permit limited relative rotation of said sleeve and said disc, said recess means comprising a plurality of circumferentially spaced apart notches about the periphery of said disc for receiving said detent means.

16. The combination as set forth in claim 15 wherein said detent means comprises a radially movable plunger mounted on said housing, said biasing means biasing said plunger radially inwardly to be received by one of said notches; said means for moving said lock means including an undulating rim portion on said drive means engageable with said plunger to move said plunger radially outwardly when said drive means rotates said screw shaft, and said lost motion connection between said drive means and said screw shaft comprises apertures in said drive means receiving said drive lugs and permitting movement of said drive lugs relative to said recesses in said drive means.

17. Apparatus comprising:
a rotatable output member;
a rotatable input member connected to said output member with a lost motion connection for driving said output member in either direction;
lock means including a part with a hub portion rotatably mounted on said output member with a lost motion connection and having a cooperating portion movable from a locking position for preventing, in cooperation with said part, rotation of said output member to a non-locking position, in response to relative angular displacement of said lock means and said input member in a first direction, said second portion being returnable to said locking position in response to relative angular displacement of said lock means and said input member in an opposite direction; whereby said output member is substantially instantaneously locked after limited rotary movement of said output member and said lock means in said opposite direction;

said input member and said lock means being relatively angularly displaced in said first direction in response to rotation of said output member by said input member.

* * * * *